United States Patent [19]

Aarsen et al.

[11] 4,276,653
[45] Jun. 30, 1981

[54] DEVICE FOR RECEIVING RADIO CALL MESSAGES

[75] Inventors: Jan A. Aarsen, Gouda; Herman da Silva, Voorburg, both of Netherlands

[73] Assignee: Staat der Nederlanden (Staatsbedrijf der Posterijen, Telegrafie en Telefonie), The Hague, Netherlands

[21] Appl. No.: 29,492

[22] Filed: Apr. 12, 1979

[30] Foreign Application Priority Data

Apr. 14, 1978 [NL] Netherlands ............... 7804012

[51] Int. Cl.³ .................... H04B 1/06; H04B 7/04
[52] U.S. Cl. .................................. 455/56; 455/49; 455/133; 455/140
[58] Field of Search ............... 325/51, 53, 55, 64, 325/67, 31, 301, 302, 308; 307/9, 10 R; 340/15.5 R, 23, 25, 26; 455/49.53, 54.56, 58.59, 132, 133, 140, 32

[56] References Cited

U.S. PATENT DOCUMENTS

| | | | |
|---|---|---|---|
| 3,268,816 | 8/1966 | Featherston | 455/140 |
| 3,518,674 | 6/1970 | Moorehead | 455/54 |
| 3,530,434 | 9/1970 | Stites et al. | 455/53 |
| 3,860,872 | 1/1975 | Richardson | 455/140 |
| 4,012,597 | 3/1977 | Lynk, Jr. | 455/53 |
| 4,056,781 | 11/1977 | Hetebrij | 455/32 |

Primary Examiner—Benedict V. Safourek
Assistant Examiner—Tommy P. Chin
Attorney, Agent, or Firm—Hugh Adam Kirk

[57] ABSTRACT

Device for receiving radio call messages, preferably on board ships, which device comprises a number of receivers (1) for different frequencies from various stations and/or transmitters and means for processing the messages. The output of each receiver is connected to the input of a shift register (4) of which the output signal is a binary signal having the value "1" or "0" and each output is fed to the input of an identifier (11) for determining the pertinence of the messages to the relevant ship. The outputs of the identifier or of the identifiers (11) are connected to a switching unit (14), which, in case the identifier means (11) has identified a message pertinent to the relevant ship, connects the appropriate shift register to a store (13) available at that moment. A cyclic scanner (18) then quickly and successively reads out the completed and stored messages and transfers them to a terminal station for further storing and processing.

8 Claims, 3 Drawing Figures

PULSE TIME DIAGRAM OF CLOCK PULSES

ALTERNATE PULSE-TIME DIAGRAM

DEVICE FOR RECEIVING RADIO CALL MESSAGES

BACKGROUND OF THE INVENTION

The invention relates to a device for receiving radio call messages, preferably on board ships, which device comprises a number of receivers for different frequencies and means for processing the messages, the output of each receiver being connected to the input of a shift register of which the output signal, having the value "1" or "0," is fed to the input of an identifier for determining the pertinence of the messages to the relevant ship.

A device of this type for common use is known in principle.

Irrespective of their sort or destination, call messages can be transmitted by various transmitters on said frequencies, predetermined for transmitting call messages. Consequently a certain ship that does not want to miss any of the messages destined to or of importance for it has to listen in on all the relevant frequencies. Hitherto this has been a difficult problem.

Of course it is possible to tune a separate receiver in to each frequency, and to connect a decoder-processor combination to the output. In this way all the messages are received and judged as to their relevance to the ship, after which the messages that are of importance for the ship are further processed. This method, however, requires much equipment for storing and examining messages that are not relevant to the ship.

Another imaginable method comprises only one receiver, which alternately scans all the relevant frequencies and which identifies a message when it is detected. The alternate scanning of five or six frequencies has to take place within 2 seconds, so that no messages will get lost. This time suffices to have a message on one of the frequencies detected and judged as to its relevance by the decoder-processor combination. The identification of the message detected, however, may require as long as 4.5 seconds, so that there is a chance that messages will get lost. This need not be the case when use is made of a coupled system in which the trasmitters are in connection with one another and arrangements can be made as to the moments when messages are to be transmitted. Such a system, which is used in the Japanese waters, is generally not usable in areas with intensive international communication traffic.

SUMMARY OF THE INVENTION

The invention provides a solution for the problem posed, which is attractive from an economic point of view, and which offers the possibility of processing all the important messages. Said solution comprises connecting the outputs of the identifier or identifiers to a switching unit, which, in case one or more identifiers has identified a message or message pertinent to the relevant ship, connects the appropriate shift register of that receiver to an available storage device. A cyclic scanner then reads out the storage device and transfers the message to at least one terminal station for further storing and processing the relevant message so provided.

BRIEF DESCRIPTION OF THE DRAWINGS

The above mentioned and other features, objects and advantages, and a manner of attaining them are described more specifically below by reference to embodiments of this invention shown in the accompanying drawings, wherein.

DETAILED DESCRIPTION OF PREFERRED EMBODIMENTS

Figure 1:
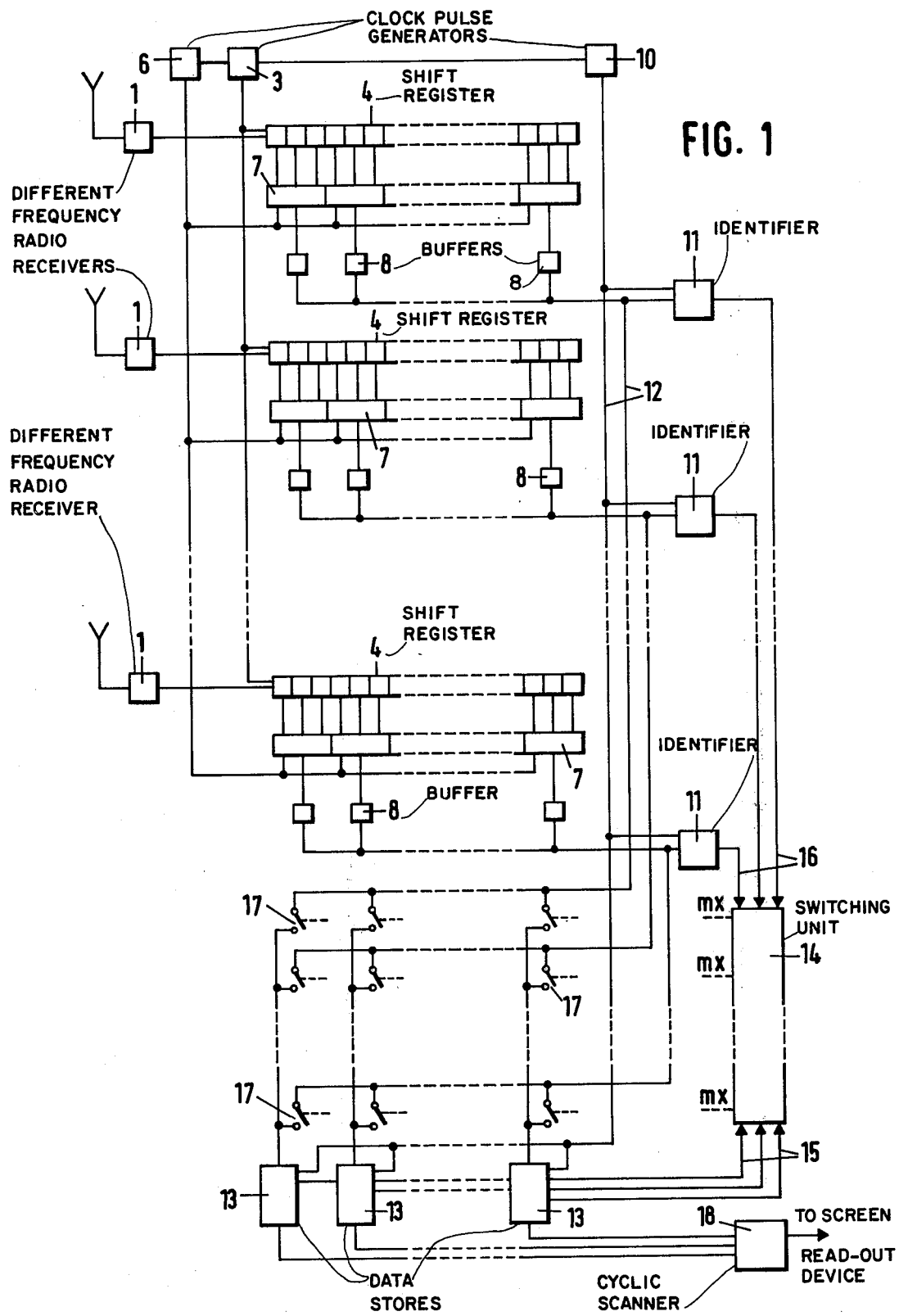
FIG. 1 is a schematic block wiring diagram of a receiver circuit of a preferred embodiment of this invention, for the control of the circuit shown in FIG. 1.
Figure 2:
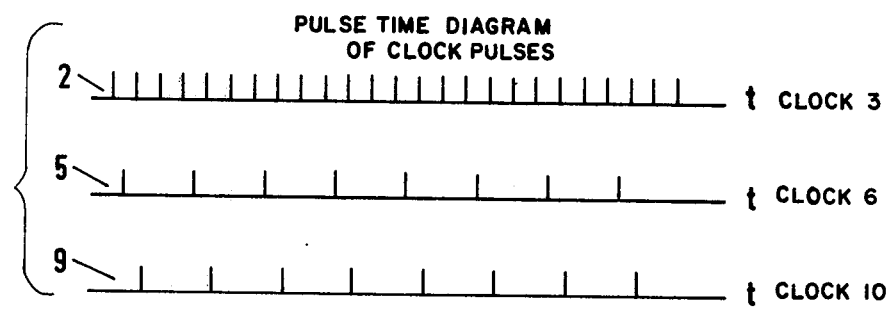
FIG. 2 is a pulse-time diagram.

A receiver 1 is tuned in to each frequency that has to be read (FIG. 1). The speed of transmission or modulation rate of the messages received is 100 Baud. The output of each receiver is scanned by means of a pulse series 2 (FIG. 2) supplied by a clock pulse generator 3, delivering pulses at a speed of 300 pulses to the second, the value of the signal ("1" or "0"), found at the moment of scanning being introduced into a 30-bit shift register 4. Consequently, in the case of a signal received ideally with regard to the time, the shift register 4 always contains a series of three consecutive sampling bits of the same value for each "1" or "0" signal. As the transmission takes place by means of 10-bit words, the shift register can contain exactly one word. This is necessary for the identification of a call message. The shift register is read out by a number of majority of sampling elements stored in circuits 7, which are each connected to three consecutive positions of the shift register. The result obtained from the majority elements 7 is transferred to the storage device or buffers 8 by means of a second pulse series 5 (FIG. 2) and at speed of 100 pulses to the second, which second series of pulses appear shortly after each third pulse of the series 2, and are supplied by a clock pulse generator 6, which is controlled by the clock 3. The result obtained from the buffers 8 is transferred to the identifier 11 by means of a third pulse series of clock pulses 9 (FIG. 2). These pulses 9 are at a speed or frequency of 100 pulses to the second, which pulses appear shortly after each of the pulses of the series 5, and are supplied by a clock pulse generator 10, which is also controlled by the clock 3.

Now the call messages received via the various receivers 1, which, though having equal speeds of transmission, are not synchronous with respect to one another, have all been integrated into one bit-synchronous time scheme. That, is the incoming signals at receivers 1 are random in time while the same messages stored in the majority elements 7 of registers 4 are in synchronism. Thus after each pulse of the clock 6, or after each shift of the bit signal sequences by one (that is after 10 ms), the significance of the bit signal sequence provided by the receiver 1 is determined in the identifier 11 in the way as indicated in CCIR Recommendation 493.

When the identifier finds out that a call message received is destined for the ship itself or of importance for it, the common output conductor 12 of the relevant buffers 8 is coupled to a free digital memory, store, or storage device 13. For this purpose the relevant conductor 12 is coupled via a switch 17 to such a free store 13 by a switching unit 14, which receives information, via the conductors 15, from a number of stores 13 about the availability of these stores. This switching unit 14 also is informed by the identifiers 11, via the conductors 16, about the reception of a pertinent message. There are m memories or stores 13, so that for each horizontal row of m switches 17 there are a number of m connecting lines (mx in FIG. 1) between the switching unit 14 and these switches 17. Each store 13 has sufficient capacity for storing a whole call message. This message, however, only relates to the indication of the sort of the message and to the part of the call message following after the address, for the part containing the address has already passed and has been utilized by the identifier 11.

A cyclic scanner 18 examines if the stores contain call messages. This is ascertained when all the relevant information of a call message has been registered in a store, so that the scanner can read out this information at a much higher speed than the speed at which the store has been filled. The speed of filling amounts to e.g. 10 kbits/s (thousand bits per second), so that the store is read out within 50 ms and the call message is made visible on a screen. It requires more time to make a print on paper. This time determines the duration of the scanning cycle.

Figure 3:
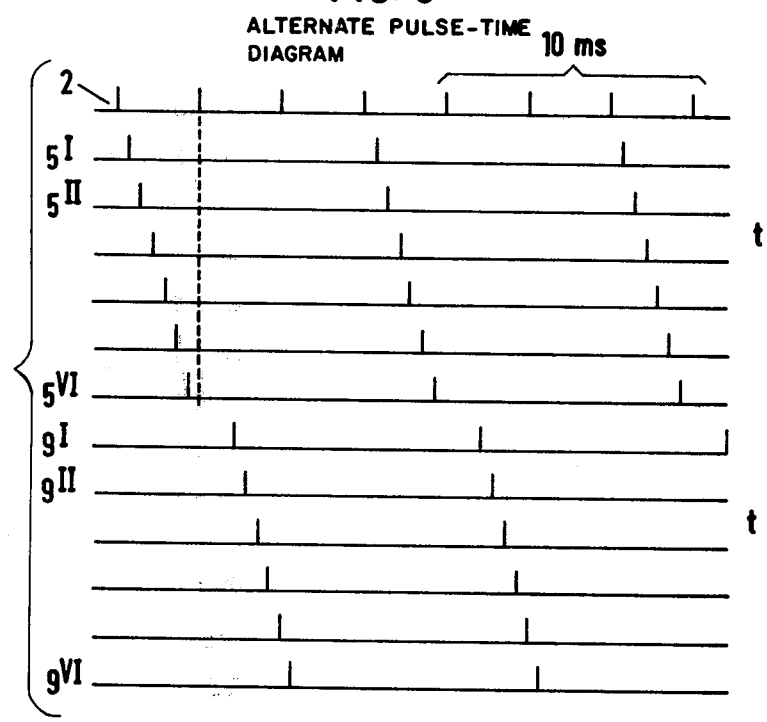
FIG. 3 is a pulse-time diagram for the control of the circuit shown in FIG. 1 according to a modified embodiment.

Instead of a number of, for example, six identifiers 11, one identifier will suffice, which identifier is cyclically connected to the six series of buffers 8. This implies that also six pulses 5 ($5^I-5^{VI}$, FIG. 3) are needed per period, in which formerly one pulse 5 was required. The six pulses 5 have all to appear within two consecutive pulses 2, so that within 10/3 ms they are each fed to a next series of buffers 8. Further there are also six pulse series 9 ($9^I-9^{VI}$, FIG. 3) needed to enable the identifier 11 to read out each of the series of buffers 8.

While there is described above the principles of this invention in connection with specific apparatus, it is to be clearly understood that this description is made only by way of example and not as a limitation to the scope of this invention.

What we claim is

1. Device for receiving radio call messages on a ship from different transmitters at different stations, which device comprises a number of receivers (1) for different frequencies from said different transmitters and means for storing and processing the messages received, said device comprising:
   (A) a shift register means (4) connected to the output of each receiver,
   (B) an identifier (11) means connected to the output signal, having the value 1 or 0, from said shift register to provide an output control signal with respect to the pertinence of the messages to said ship,
   (C) a plurality of storing means (13),
   (D) a switching unit (14) connected to the outputs of said identifier means,
   (E) said switching unit (14) in response to said output control signal connects the appropriate shift register means to an available storing means (13),
   (F) a commonly controlled clock generator means for controlling said shift register means, said identifier means, and said storing means, which said clock generator means integrates asynchronously received signals into synchronous signals, and
   (G) a cyclic scanner (18) for reading out said storing means to one or more terminal stations for further storing and processing the pertinent stored message.

2. A device for receiving a plurality of binary radio call messages, said messages being transmitted on different frequencies and at random times, said device comprising:
   (A) a number of receivers for said different frequencies,
   (B) an address shift register connected to each receiver having a capacity for a plurality of bits corresponding to the address of the station having said receivers,
   (C) an identifier means connected to said shift registers to provide an output control signal with respect to the pertinence of the messages to said address-receiving station,
   (D) a plurality of storage devices for the pertinent received messages,
   (E) a switching unit in response to said output control signal connects pertinent messages from the appropriate address shift register to an available storage device,
   (F) a cyclic scanner for reading out the pertinent message stored in said storage devices,
   (G) a clock pulse generator means for controlling said address shift registers, said identifier means and said storage devices which integrates asynchronously received signals into synchronous signals, and
   (H) at least one terminal station for further storing and processing the pertinent stored messages from said storage devices.

3. A receiving device according to claim 2 wherein said receivers are on a ship.

4. A receiving device according to claim 2 including a plurality of identifier means, one for each said receiver's address shift register.

5. A receiving device according to claim 2 wherein said clock pulse generators for controlling said identifiers and said storage means have the same frequency.

6. A receiving device according to claim 2 wherein said clock pulse generator for controlling said address shift registers operates at a higher frequency of more than twice that of the frequencies of said clock pulse generators for controlling said identifier means and said storage devices.

7. A receiving device according to claim 2 comprising a single identifier means, and said clock generators for controlling said identifier means and said storage devices having a frequency several times greater than that of said clock pulse generator for controlling said address shift register.

8. A receiving device according to claim 2 wherein said clock pulse generator for controlling said address shift registers also controls the other two clock pulse generators.

* * * * *

UNITED STATES PATENT AND TRADEMARK OFFICE
CERTIFICATE OF CORRECTION

PATENT NO. : 4,276,653
DATED : June 30, 1981
INVENTOR(S) : Jan Antonie Aarsen et al It is certified that error appears in the above-identified patent and that said Letters Patent are hereby corrected as shown below:

Column 1, line 62, change "message" to -- messages --.
Column 2, line 5, delete "for control of the circuit shown in FIG. 1;" and insert after the word "diagram" in line 6; line 32, change "device" to -- devices --.

Signed and Sealed this

First Day of December 1981

[SEAL]

Attest:

Attesting Officer

GERALD J. MOSSINGHOFF

Commissioner of Patents and Trademarks